UNITED STATES PATENT OFFICE.

ANTENOR SALA, OF MEXICO, MEXICO.

FIRE-EXTINGUISHING COMPOUND.

967,246.  Specification of Letters Patent.  Patented Aug. 16, 1910.

No Drawing.  Application filed March 16, 1907.  Serial No. 362,625.

*To all whom it may concern:*

Be it known that I, ANTENOR SALA, a citizen of the Republic of Mexico, residing at the city of Mexico, Republic of Mexico, have invented certain new and useful Improved Fire-Extinguishing Compounds, of which the following is a specification.

The object of this invention is to effect an improvement in the manner of extinguishing fires, by throwing or spraying a liquid on the burning material, and which produces a coat or film that will effectively prevent the further access of, or suppress the air supply necessary for combustion.

A liquid which will extinguish fires in this, the most effective manner, should be cheap, easily handled and applied, stable when exposed to extremes of heat and cold and changes of the weather even for long periods, and be without action upon and be easily removed from receptacles and from materials to which it is applied. The liquids which have hitherto been used for this purpose are wanting in one or more of these particulars.

I have perfected a compound or material which meets all of these requirements, the use of small amounts of which will effectively extinguish the burning of all objects of whatever form or shape. In making this compound, I mix with a solution of a silicate or silicates, a pulverulent substance which is insoluble in the said solution and which will not decompose it, but which promotes the adherence of the silicate to walls, ceilings, or other surfaces. When applied to burning objects this material forms a thick adherent film, even after the water of solution has been driven off by the heat. This film effectively prevents the further access of air to parts already inflamed, thus smothering the flame. In a similar manner this film prevents the spread of the conflagration to those parts not yet kindled. This addition of insoluble pulverulent substances is very advantageous because the film or coating formed by the use of a clear solution containing silicates is not so thick, nor does it adhere so well, as one containing insoluble matter. The solids used for this purpose, however, should have no decomposing action upon the soluble silicates and should preferably be of such a nature that they assist in extinguishing the fire; as for example, calcium carbonate or whiting, which will be rapidly decomposed by the heat of the fire especially if it is intense, and will throw out large amounts of carbon dioxid gas which will surround the burning material and thus aid the film in preventing the access of the oxygen of the air to the burning substance.

The requirements just enumerated, I find to be best met by the use of a mixture of solution of sodium and potassium silicates with finely ground calcium carbonate. I find that very good results are attained by the use of the following proportions by weight; water 4 parts, calcium carbonate 6 parts, sodium silicate 4 parts, potassium silicate 6 parts. I do not confine myself to the use of these proportions however, and may also replace the solution of sodium or potassium silicates by a solution of any soluble silicate, of a compound silicate, or of a mixture of silicates. I find that the mixture of sodium and potassium silicates is preferable, especially in so far as stability of solution when preserved for long periods is concerned. I may also replace the calcium carbonate by any other cheap insoluble carbonate, or by any other suitable substance or mixture of substances in a powdery form, which will not decompose the solution of silicate or silicates, even after a long time. Examples of other substances which may be used for this purpose are the oxides of iron or any other metallic oxides which do not decompose a silicate solution.

When a material thus prepared is thrown or sprayed on a burning object, the flames are immediately smothered and re-ignition effectively prevented. I find that this can be done with one tenth of the volume of water necessary to extinguish a conflagration.

Although many advantages are derived from my invention when any soluble silicate is used I find that still greater advantages are derived when a compound silicate of potash and soda or a mixture of silicates of potash and soda are used.

The reason for the use of the compound silicate of potash and soda or the mixture of the silicate of soda and of the silicate of potash, is the tendency possessed by silicate of soda not to harden and the opposite property, the tendency to harden, always possessed by silicate of potash; so that by combining them they compensate each other and together with the water and the carbonate of lime, a mixture is obtained which has no tendency whatever to harden, in the cold.

The silicate of potash is preferred because it adheres to the vertical surface without running off, and at the contact with fire, the silicate of potash acquires a great hardness and adhesion, and the silicate of soda expands into the form of a hard foam; so that the compound when being dashed on an ignited body acquires a great hardness and adhesion by the silicate of potash and a considerable expansion by the silicate of soda, which causes the coating to increase in thickness. This expansion aids in making difficult the contact of the oxygen of the air with the carbids of hydrogen and prevents the formation of the flames.

In practically making a fire extinguishing compound, silicate of soda should not be used alone, for in a few days the mixture takes on a consistency so pasty, that its handling in aspirating pumps and impelling devices and in the hose is almost impossible. Nor should it have only silicate of potash, for if no care is taken to, immediately after working, wash out the pumps and hose, the certain risk is run of its hardening therein, and in order to clean them, the pumps must be taken apart and a tiresome cleaning of the hose must be made. Therefore, in making up this compound with water, carbonate of lime and a compound silicate of potash and soda should be used, or, when this cannot be had silicate of potash and silicate of soda may be combined, and a mixture will be obtained which does not harden when cold and which is sufficiently fluid to be managed almost as easily as water.

It is always better to have some insoluble incombustible material mechanically mixed with the silicates to add body to the coating. The silicates will carry this material to the burning surfaces and hold it firmly thereon when they harden. For this, as I have already pointed out, I prefer to use calcium carbonate but I do not limit myself thereto. This lime, which is used in pulverulent form, is mechanically held to the surfaces by the hardened silicates and forms therewith a coating with exceptional fire resisting qualities.

What I claim as new and desire to secure by Letters Patent, is—

1. An improved stable fire extinguishing material for use in hose and suitable pumps, consisting of a solution of sodium and potassium silicates mixed with pulverulent calcium carbonate in the proportions substantially as set forth.

2. The improved fire extinguishing compound for use in hose and suitable impelling devices consisting of a solution of potassium and sodium silicates mixed with insoluble material in the proportions substantially as set forth.

3. The improved fire extinguishing compound for use in hose and suitable pumps containing a mixture of substantially four parts by weight of water, four parts by weight of sodium silicate and six parts by weight of potassium silicate.

4. The improved fire extinguishing compound for use in hose and suitable pumps consisting of a mixture of substantially four parts by weight of water, six parts by weight of calcium carbonate, four parts by weight of sodium silicate and six parts by weight of potassium silicate.

In testimony whereof, I have signed my name to this specification, in the presence of two subscribing witnesses.

ANTENOR SALA.

Witnesses:
HERMAN J. TENFER,
EDWIN SEGER.